(12) United States Patent
Erdman

(10) Patent No.: US 11,167,493 B2
(45) Date of Patent: Nov. 9, 2021

(54) DEVICE FOR CONTROLLING SUPPLY OF A FILAMENT

(71) Applicant: Industrial Innovations Pty Ltd, Mona Vale (AU)

(72) Inventor: Alan Erdman, Mona Vale (AU)

(73) Assignee: INDUSTRIAL INNOVATIONS PTY LTD, Mona Vale (AU)

(*) Notice: Subject to any disclaimer, the term of this patent is extended or adjusted under 35 U.S.C. 154(b) by 51 days.

(21) Appl. No.: 16/612,522

(22) PCT Filed: May 14, 2018

(86) PCT No.: PCT/AU2018/000070
§ 371 (c)(1),
(2) Date: Nov. 11, 2019

(87) PCT Pub. No.: WO2018/204968
PCT Pub. Date: Nov. 15, 2018

(65) Prior Publication Data
US 2020/0198239 A1    Jun. 25, 2020

(30) Foreign Application Priority Data
May 12, 2017   (AU) ................................ 2017901783

(51) Int. Cl.
*B29C 64/321*    (2017.01)
*B29C 64/118*    (2017.01)
*B29C 64/209*    (2017.01)
*B33Y 30/00*     (2015.01)

(52) U.S. Cl.
CPC .......... *B29C 64/321* (2017.08); *B29C 64/118* (2017.08); *B29C 64/209* (2017.08); *B33Y 30/00* (2014.12)

(58) Field of Classification Search
CPC .. B65H 63/086; B65H 63/036; B65H 49/322; B29C 64/321; B29C 64/118; B29C 64/209
See application file for complete search history.

(56) References Cited

U.S. PATENT DOCUMENTS 3,633,809 A    12/1972  Born
8,157,202 B2    4/2012  Taatjes et al.

FOREIGN PATENT DOCUMENTS

CN    105836647 A    8/2016
EP    0084606 A1    8/1983

*Primary Examiner* — Joseph S Del Sole
*Assistant Examiner* — Mohamed K Ahmed Ali
(74) *Attorney, Agent, or Firm* — Nath, Goldberg & Meyer; Joshua B. Goldberg

(57) ABSTRACT

The present invention relates to a device (10) for controlling supply of a filament (14). The device (10) includes a grooved rotatable wheel over which the filament (14) runs and biasing means (22 & 24). The wheel (12) has a hub (16) and a pair of flexible flanges (18 & 20) extending radially from the hub (16). The biasing means (22 & 24) are adapted in use to force the flexible flanges (18 & 20) to bend towards each other so as to embrace the filament (14) thereby pressing the filament (14) tight against the hub (16).

19 Claims, 6 Drawing Sheets

DEVICE FOR CONTROLLING SUPPLY OF A FILAMENT

This is a National Phase Application filed under 35 U.S.C. 371 as a national stage of PCT/AU2018/000070, filed May 14, 2018, an application claiming the benefit of Australian Application No. 2017901783, filed May 12, 2017, the content of each of which is hereby incorporated by reference in its entirety.

TECHNICAL FIELD

The present invention generally relates to a device for controlling supply of a filament in additive manufacturing. More particularly, the present invention relates to a device for controlling supply of a filament for use in three dimensional printers.

BACKGROUND OF THE INVENTION

'Fused Filament Fabrication' or 'Fused Deposition Modelling' is a form of additive manufacturing and involves a printing method which is characterised by the requirement of a mechanism serving the purposes of generating and applying force upon a pre-made printing filament. By way of pushing and pulling, this force is used to control the printing filament within a hot end zone of the printer. The hot end is adapted to melt the filament allowing the material to flow to carry out the printing process.

It is commonplace for existing devices for controlling supply of a filament, which can be regarded as extruders, to utilise a variation on a basic method that employs direct contact between the printing filament and one (or more) pinch type rollers. Such a set up typically consists of a rotating drive rod (commonly referred to as a hobbed gear) and an idler bearing held under spring loaded tension against the drive rod. At times, two drive rods are employed or the idler bearing maybe set at a predetermined gap to suit different printing situations. The existing devices for controlling supply of a filament have the shortcoming in that they require an amount of force to be concentrated within a small area to enable control of the filament in an efficient manner. To this end, a high pressure is required to be applied at directly opposed contact points which are brought closer together. However, the use of excessive force over a small contact area often has a detrimental impact upon the printing filament. With hard material or stiff printing filament, damage including scoring or gouging of the printing filament may occur causing damage to the filament profile resulting in slippage and associated loss of printing quality and print failures. With softer material or flexible type filament, for example thermoplastic elastomer, the increase in pressure readily leads to filament slippage and/or deformation of the cylindrical filament profile. This deformation increases the incidence of filament buckling and extruder jams which lead to failures.

It is an object of the present invention to provide a device for controlling supply of a filament which may overcome the abovementioned shortcoming or which will at least provide a useful alternative.

SUMMARY OF THE INVENTION

According to the present invention, there is provided a device for controlling supply of a filament, the device including:

a grooved rotatable wheel over which the filament runs, the wheel having a hub and a pair of flexible flanges extending radially from the hub; and biasing means adapted to in use force the flexible flanges to bend towards each other so as to embrace the filament thereby pressing the filament tight against the hub.

Preferably, the flanges are substantially parallel to each other. More preferably, the flanges are so configured and shaped as to complement a circular profile of the filament.

In a preferred embodiment, the biasing means include a pair of pre-shaped profiles adapted to be in contact with the respective flanges. Preferably, each profile is annular in shape shadowing the corresponding flange. Preferably, the biasing means also include a plurality of bearings which are supported by the profile. More preferably, the bearings are located around a designated arc of each annular profile so as to in use engage the circular flanges. Alternatively, the biasing means are in form of two pieces of low friction material such as PFTE.

Preferably, the device includes top and base plates adapted to respectively hold the bearings and profiles which in combination surround the wheel. The bearings may include needle, thrust or ball bearings. More preferably, the device includes a motor with a shaft being connected to and holding the wheel. As such, the shaft is configured to drive the wheel which in turn facilitates feeding of the filament. Even more preferably, the motor is attached to the base plate.

Preferably, the top and bottom plates are brought together so as to apply pressure to the flexible flanges to form or hold the desired shape. More preferably, the pressure is applied through the use of one or more tensioning means. Even more preferably, the tensioning means are in the form of columns. Alternatively, the tensioning columns are joined with a biasing mechanism which enables minor movement of the flanges to accommodate variations in filament diameter.

Preferably, the device also includes a first guiding means which in use is in engagement with the wheel. More preferably, the first guiding means is located at an exit zone where the filament disengages the wheel. Even more preferably, the first guiding means includes a case; an impediment extending from the case and being adapted to be snugly received in a groove created by the pair of flanges; and an elongate hollow with an opening adapted to receive the filament as it departs from the wheel and facilitate continuous guided travelling of the filament until it leaves the device. It is preferred that the elongate hollow is in the form of a tube adapted to serve as an intermediary between the wheel and a hot end zone of the printer. More preferably, the impediment is in the form of a tongue and a protrusion that projects outward from the side of the opening of the tube. The protrusion is provided to ensure no undesired cavity exists at or near the opening thereby reducing or eliminating the possibility of buckling of the filament. The protrusion may also be capable of facilitating and guiding the flexible flanges to flow over the elongated tube. Optionally, additional biasing means are provided to urge the flanges against the protrusion at and around the opening so as to facilitate a smooth entrance of the filament into the tube. Conveniently, the first guiding means may lead directly to the hot end zone. Alternatively, the first guiding means may lead to a tubing system enabling the filament to travel a desired distance before entering the hot end zone. Conveniently, the first guiding means is used at both the entry and exit point where the filament encounters the rotatable wheel.

Optionally, the device includes a second guiding means with a supporting block and a protuberance extending from the block. Preferably, the protuberance is adapted to be received in the groove between the flanges. Even more preferably, the protuberance has an edge which is configured to guide the filament 14 into engagement with the hub of the wheel. More preferably, the second guiding means is located at an entry zone where the filament engages the wheel. The supporting block may also include a duct which in combination with the edge of the protuberance facilitate loading and unloading of the filament onto and from the wheel. Even more preferably, the second guiding means may be replaced by the first guiding means at the entry zone.

In a preferred embodiment, one of the profiles includes an extension around its periphery. As a consequence, where the extension of the one of the profiles meets the periphery of the other profile is offset with respect to where the two flanges meet under the pressure applied by the profiles.

Optionally, the device includes a third guiding means adapted to enable the filament to be fed from any chosen angle. Preferably, the third guiding means is in the form of an annular bearing or pulley. More preferably, the third guiding means is located near the entry zone. The third guiding means may be an idler or a driver to facilitate loading and unloading of the filament.

Conveniently, the top and base plates are hinged together so as to facilitate opening and closing of the device to allow access to its interior.

Preferably, either or both of an internal surface of each flange and the circumference of the hub include(s) gripping means adapted to enhance the grip on the filament. More preferably, the gripping means are in the form of a textured pattern.

Preferably, a tubing system is provided at the entry point to the guiding means so as to allow for guided feeding of the filament from a holding spool to the device. The tubing system may follow an arc allowing for the filament to be fed from any chosen angle into the guiding means.

BRIEF DESCRIPTION OF THE DRAWINGS

The invention may be better understood from the following non-limiting description of preferred embodiments, in which.

DETAILED DESCRIPTION OF THE DRAWINGS

It should be noted that in the present specification, 'hard or stiff' materials used to form the filament include those having a shore D hardness greater than 58 whereas 'softer or flexible' materials include those having a shore A hardness lower than 100. The shore hardness of the flexible flanges in the present invention is optimally chosen in order to achieve desired shape, grip, flexibility and longevity. Also, the filament described herein has a diameter of 3 mm. However, the device of the present invention may be used to feed filaments with any diameter, eg. 1.75 mm as commonly used within the 3D printing industry.

Figure 1:
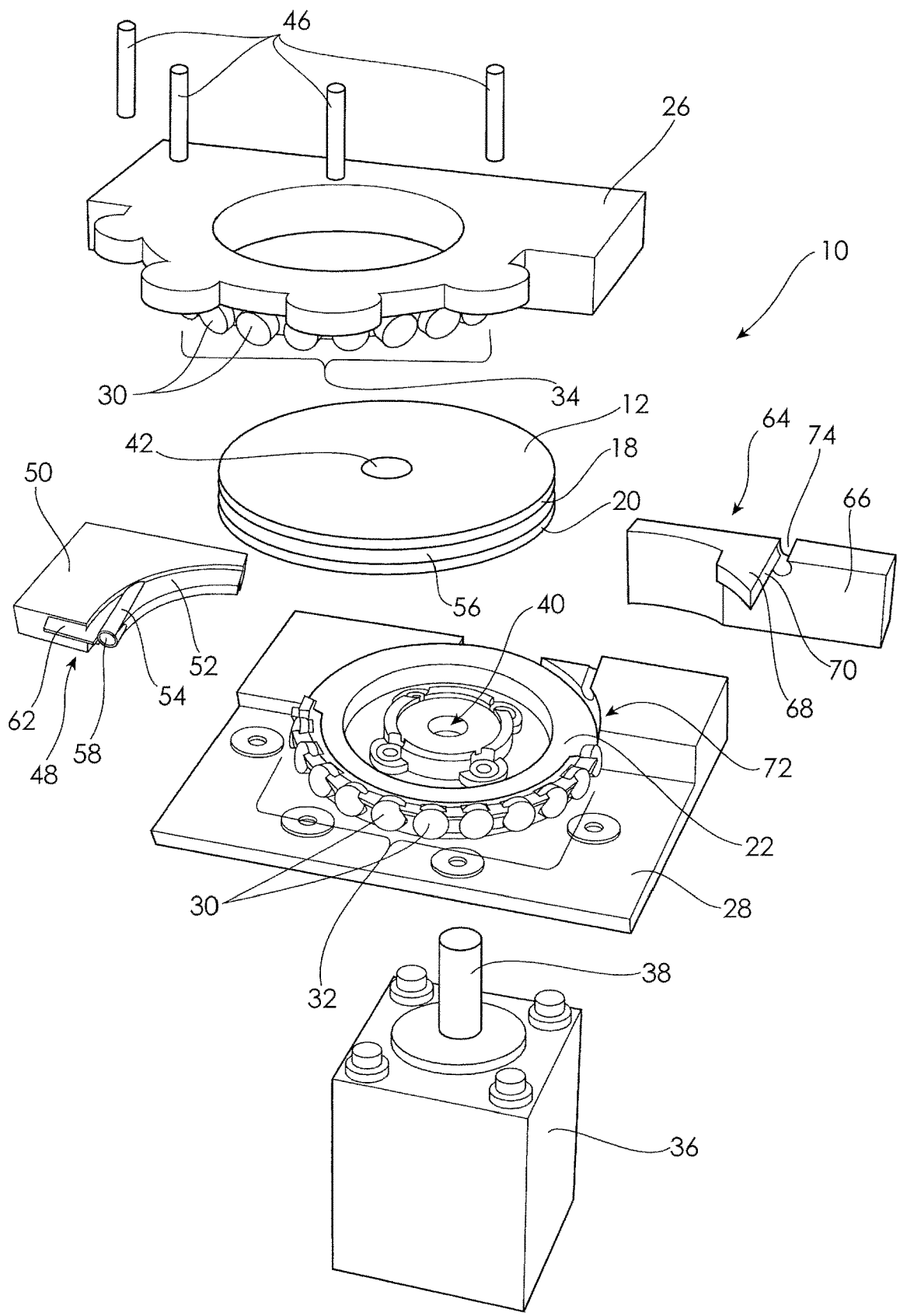
FIG. 1 is an exploded perspective view of a device for controlling supply of a filament in accordance with a preferred embodiment of the present invention.
Figure 2:
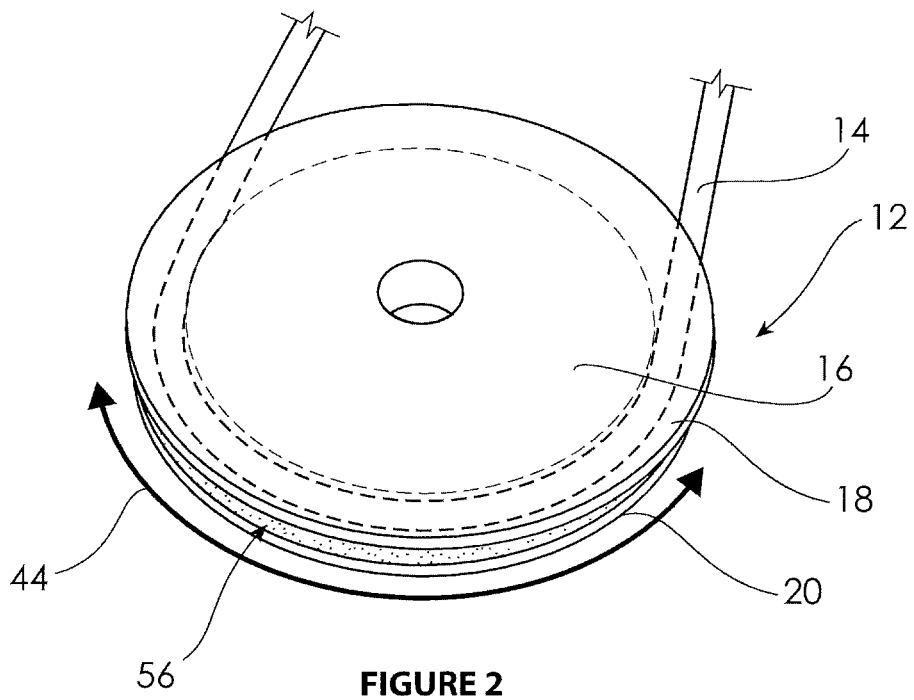
FIG. 2 is a perspective view of the wheel of the device of FIG. 1 also showing its interior in phantom dotted lines.

Referring to FIGS. 1 and 2, a device 10 for controlling supply of a filament is shown having a grooved rotatable wheel 12 over which a filament 14 runs. The wheel 12 has a hub 16 and a pair of flexible flanges 18 & 20 extending radially from the hub 16. The hub 16 has a smaller diameter than the flanges 18 & 20. The filament controlling device 10 also has biasing means adapted in use to force the flexible flanges 18 & 20 to bend towards each other so as to embrace the filament 14 thereby pressing the filament 14 tight against the hub 16. It should be noted that the flanges 18 & 20 extend from the circumference of the hub 16 by such a magnitude that when bent and folded, they completely or at least substantially enclose and envelope the filament 14.

Figure 3:
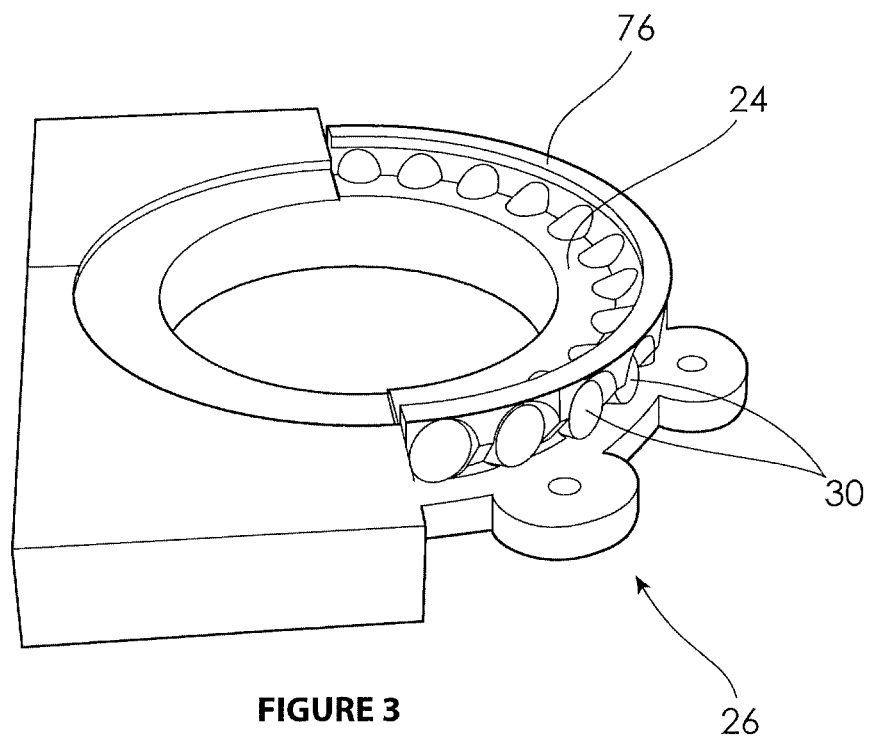
FIG. 3 is a top perspective view of the top plate of the device of FIG. 1.

As shown in FIGS. 1 and 3, the device 10 includes top and base plates 26 & 28 adapted to respectively hold the biasing means. The biasing means include a pair of pre-shaped profiles 22 & 24 which in use are in contact with the respective flanges 20 & 18. Each profile 22, 24 is annular in shape shadowing the corresponding flange 20, 18. In the present embodiment, the biasing means also include a plurality of bearings 30 which are supported by the respective profile 22, 24. The bearings 30 are arranged in a curved row being evenly distributed around a designated arc 32, 34 (see FIG. 1) of each annular profile 22, 24 so as to in use engage the circular flanges 20 & 18. The top and base plates 26 & 28 respectively hold the bearings 30 and profiles 24 & 22 which in combination surround the wheel 12. The bearings 30 functions to facilitate bending or folding or holding the flanges 18 & 20 to the desired shape and to reduce friction between the rotating wheel 12 and the contacting surface of the profiles 22 & 24. The filament device 10 has a stepper motor 36 with a shaft 38 connected to the wheel 12. As such, the shaft 38 is configured to hold and drive the wheel 12 which in turn facilitates feeding of the filament 14. The stepper motor 36 is attached to the base plate 28 via the shaft 38 which protrudes through a hole 40 before engaging aperture 42 provided in the centre of wheel 12. The stepper motor 36 is controlled by three dimensional printing hardware and software which are designed to dictate the rate and direction of rotation. The stepper motor 36 may have a gear reduction box. In the present embodiment, in operation, the drive wheel 12 movably holds the filament 14 through an arc 44 of 180 degrees (refer to FIG. 1) with the bent flanges 18 & 20 applying constant pressure on the filament 14 along the entire feeding path. This provides significant gripping contact areas between the filament 14, the circumference of the hub 16 and the internal surfaces of the flanges 18 & 20, which enables exertion of a significant amount of dragging force upon the printing filament. As a result, the likelihood of filament damage, slippage or deformation is significant reduced or entirely eliminated. It should be noted that although not shown in the present specification, the arc 44 may be adjusted to operate between 10 and 300 degrees by way of rearranging or altering the configuration of the guiding components located around the wheel 12.

As shown in FIG. 1, the top and base plates 26 & 28 are pressed together to surround drive wheel 12. Four tensioning columns 46 are used to press profiles 24 & 22 against flanges 18 and 20. Although not shown in the present specification, it is contemplated that the top and base plates 26 & 28 may be joined with a biasing mechanism which enables minor movement of the flanges 18 & 20 to accommodate variations in filament diameter.

Figure 4:
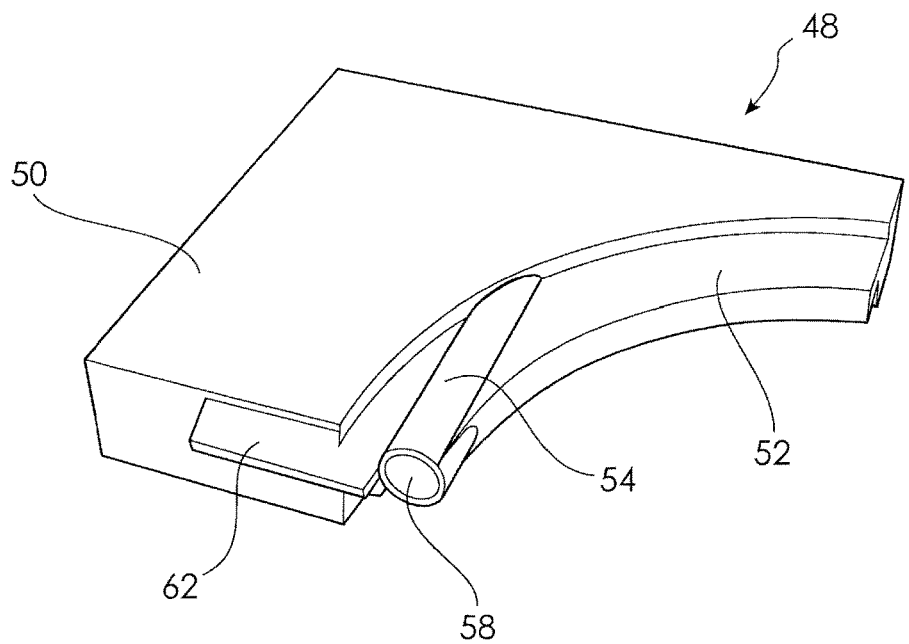
FIG. 4 is a top perspective view of a first guiding means of the device of FIG. 1.
Figure 5A:
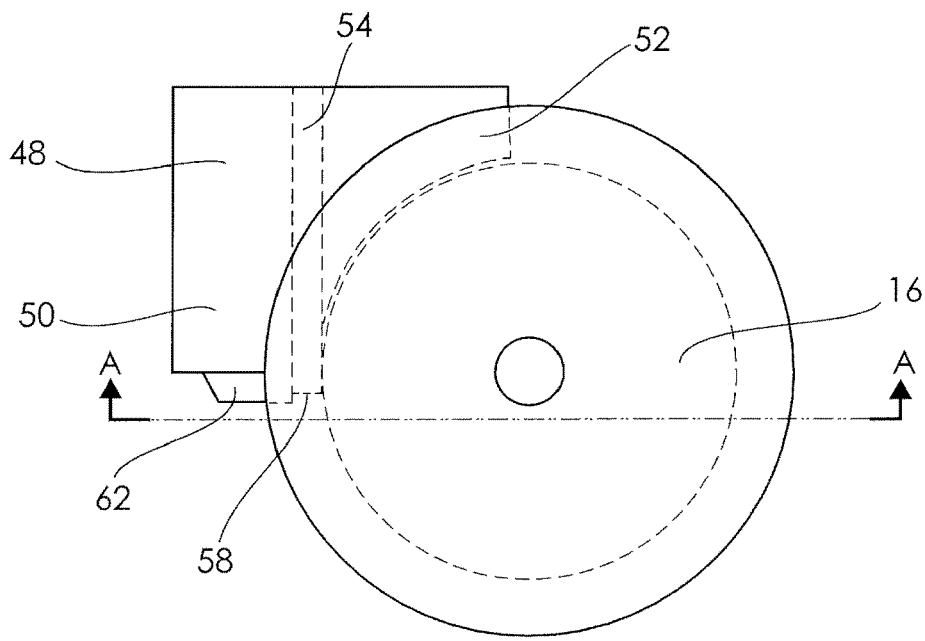
FIG. 5A is a top plan view of the first guiding means of FIG. 4 engaged with the wheel of the device of FIG. 1.
Figure 5B:
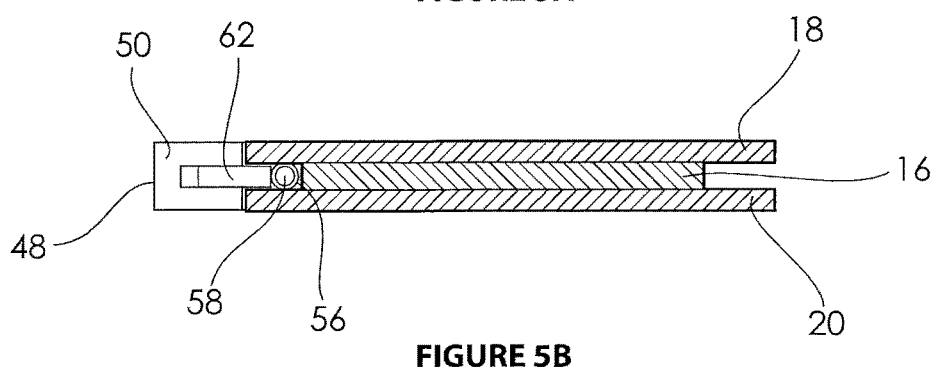
FIG. 5B is a cross sectional view of the first guiding means and wheel shown in FIG. 5A taken along the plane A-A.

Referring to FIGS. 1, 4, 5A & B, the device 10 also includes a first guiding means 48 which in use is in engagement with the wheel 12. The first guiding means 48 has a case 50, an impediment in the form of a protrusion 62 and tongue 52 extending from the case 50 and an elongate hollow in the form of a tube 54. The protrusion 62 projects outward from the side of the opening 58 of the tube 54. The protrusion 62 and tongue 52 are both snugly received in a groove 56 created by the pair of flanges 18 & 20. The tube 54 has an opening 58 which receives the filament 14 as it departs from the wheel 12. The tube 54 facilitates continuous guided travelling of the filament 14 until it leaves the device 10. Basically, the tube 54 is provided to serve as an intermediary between the wheel 12 and a hot end zone 60 of the printer. The protrusion 62 is provided to ensure no undesired cavity exists at or near the opening 58 thereby reducing or eliminating any possibility of buckling of the filament. It is contemplated that additional biasing means may be provided to urge the flanges 18 & 20 against the protrusion 62 at and around the opening 58 so as to facilitate an unobstructed and smooth entrance of the filament 14 into the tube 54. In the present embodiment, the impediment is integral to the first guiding means 48. It should however be appreciated that the impediment in the form of the protrusion 62 may be separate and independent of the first guiding means 48. In such an arrangement, the guiding means 48 and the impediment would still be able to serve the same purpose as a combination. In a preferred embodiment, the first guiding means 48 may lead directly to the hot end zone (see FIG. 8). However, in an alternative arrangement, the guiding means may lead to a tubing system such as a Bowden cable system which enables the filament to travel a desired distance before entering the hot end zone 60.

Figure 6:
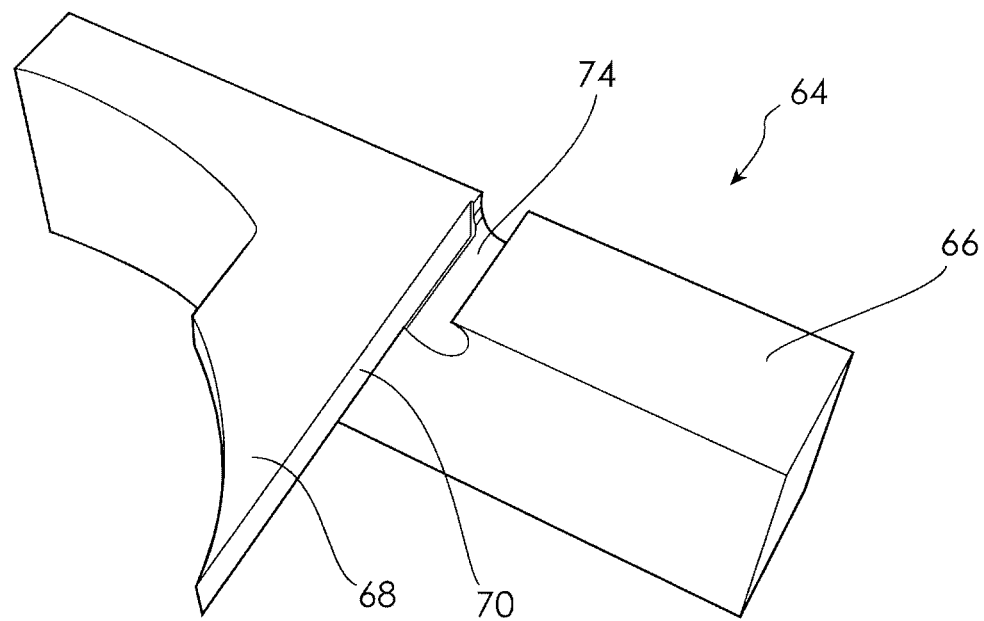
FIG. 6 is a top perspective view of the second guiding means of the device of FIG. 1.

Turning to FIGS. 1 and 6, the filament device 10 also has a second guiding means 64 with a supporting block 66 and a protuberance 68 extending from the block 66. The protuberance 68 is received in the groove 56 between the flanges 18 & 20. The protuberance 68 has an edge 70 which is designed to guide the filament 14 into engagement with the hub 16 of the wheel 12. The second guiding means 64 is located at an entry zone 72 where the filament 14 first engages the wheel 12. The supporting block 66 has a duct 74 which in combination with the edge of the protuberance facilitate loading and unloading of the filament 14 onto and from the wheel 12. In other words, the second guiding means 64 is useful in facilitating reversal of the filament if required. It will be appreciated that the second guiding means 64 may be replaced by the first guiding means 48 which can be used at both the entry and exit points where the filament 14 encounters the rotatable wheel 12.

Figure 7:
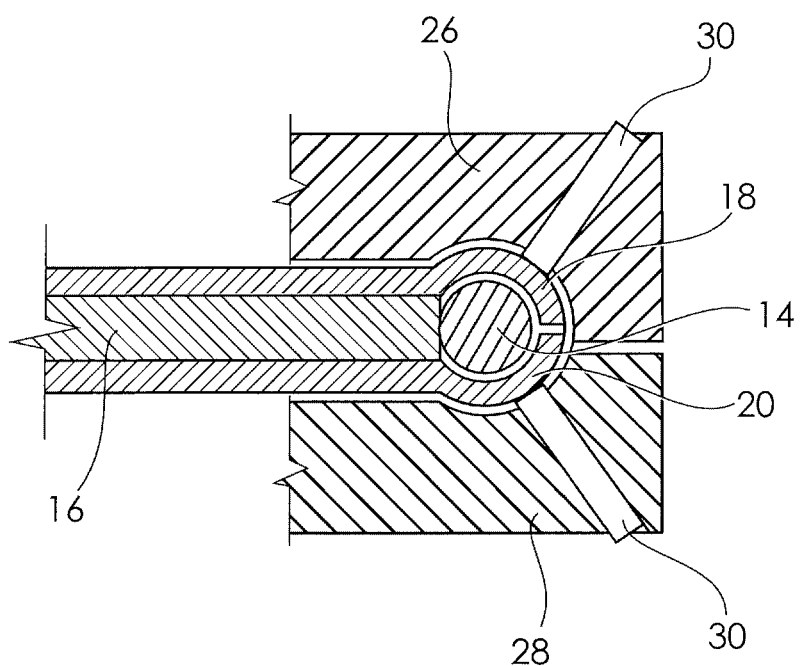
FIG. 7 is a schematic view illustrating the cross section of the device of FIG. 1 in operation

Referring to FIG. 7, the filament 14 is shown to be entrapped by flanges 18 & 20 during operation of the device. As best shown in FIG. 3, the profile 24 of the top plate 26 has an extension 76 around its periphery. As a consequence, where the extension 76 of the top profile 24 meets the periphery of the bottom profile 22 is offset with respect to where the two flanges 18 & 20 meet under the pressure applied by the profiles 22 & 24.

Figure 8:
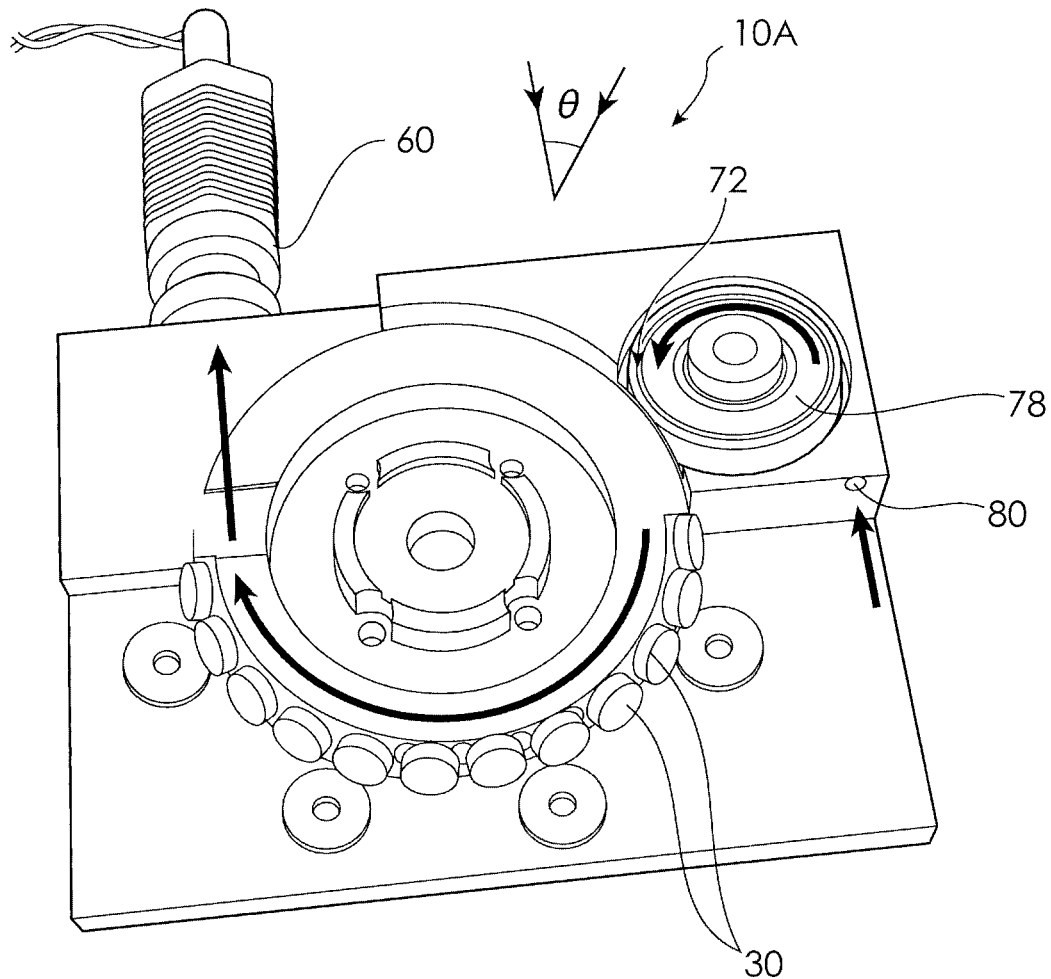
FIG. 8 is a top perspective view of a device for controlling supply of a filament in accordance with another preferred embodiment of the present invention including an additional bearing which enables feeding of the filament from a different angle.

Referring to FIG. 8, in another preferred embodiment, a device 10A has a third guiding means in the form of an annular bearing or pulley 78. The bearing or pulley 78 enables the filament to be fed from a chosen angle θ as indicated in FIG. 8. It is contemplated that the angle θ may be altered by way of re-position the bearing or pulley 78. In the present embodiment, the bearing or pulley 78 is located near the entry zone 72. The third guiding means may be an idler or a driver as desired to facilitate loading and unloading of the filament 14.

Referring to FIG. 8, in operation, the filament is fed through the orifice 80 to engage and go around the upper portion of bearing or pulley 78. The filament 14 is then led to engage the drive wheel 12 and is dragged to go around the bottom portion of the drive wheel 12 before departing the drive wheel 12 to enter the tube 54 of the first guiding means 48. The arrows shown in FIG. 8 indicate the predetermined travelling path of the filament 14 directed by the bearing or pulley 78 and the drive wheel 12.

Although not shown in the drawings of the present specification, it is contemplated that the top and base plates 26 & 28 may be hinged together so as to facilitate opening and closing of the device 10 to allow access to its interior. Also, either or both of an internal surface of each flange 18, 20 and the circumference of the hub 16 include(s) gripping means which serves the purpose of enhancing the grip on the filament 14. The gripping means may be in the form of a textured pattern. Furthermore, one or more thrust bearing may be provided and employed between each or both base plate(s) and the drive wheel.

Figure 9:
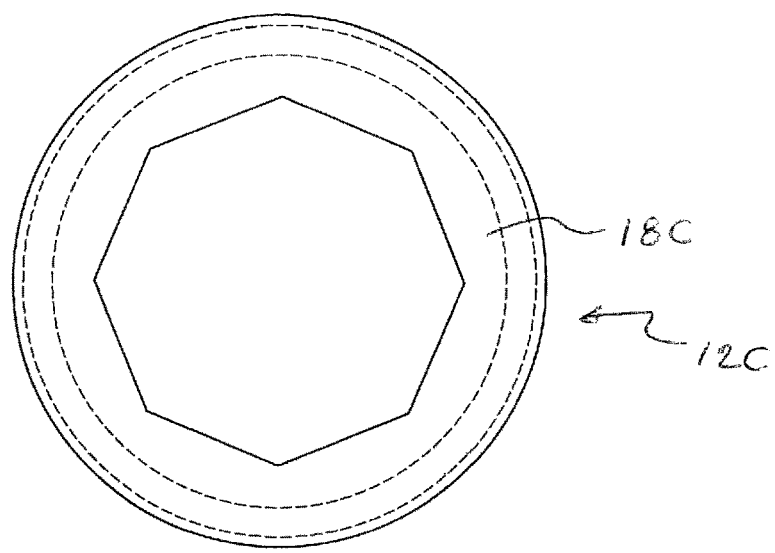
FIG. 9 is a plan view of another embodiment of the wheel of the device of FIG. 1 with phantom lines showing the internal groove.
Figure 9A:
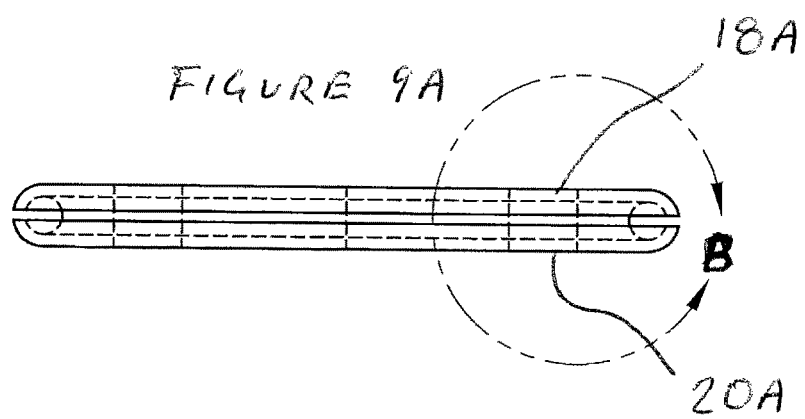
FIG. 9A is a cross sectional view of the wheel of FIG. 9.
Figure 9B:
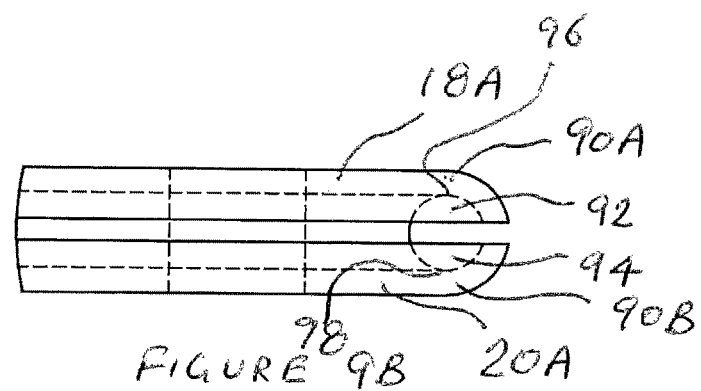
FIG. 9B is a magnified cross sectional view of a section of the wheel of FIG. 9B.

Referring to FIGS. 9, 9A and 9B, wheel 12C is shown illustrating an alternate embodiment of flanges 18A & 20A.=Each of the end portions 90A & 90B has an internal recess 92, 94 with a curved contour 96, 98 adapted to conform to the circular circumferential profile of the filament 14. As such, the shape and contour of the flexible flanges 18 and 20 on the wheel 12 are optimized to enhance performance and usability of the device 10.

It is important to note that all described embodiments of the flanges of the present invention are substantially parallel to each other. In particular, the embodiments of flanges 18A & 20A are so configured and shaped as to complement a circular profile of the filament 14.

Now that preferred embodiments of the present invention have been described in some detail, it will be apparent to a skilled person in the art that by spreading the force applied to the filament over a greater surface area, the device of the present invention may offer at least the following advantages:

1. it enables an adequate force to be applied upon the printing filament for loading and unloading thereof while removing the undesired possibility of filament damage and slippage;
2. it suitably addresses the deformation and kinking issues commonly encountered by relatively soft or flexible type filaments;
3. it suitably addresses the prone to damage issues associated with hard filaments;
4. it negates the existence and impact of minor cavities located along the filament path to an acceptable level as the flexible flanges serve to compensate and act as a buffer between the printing filament and any cavities and hence rectifies the common problem with the use of relatively soft printing filament material which when under pressure causes localised bulging of the filament into minor cavities that exist along the feeding path, resulting in filament buckling and jamming of the device;

5. it enables an increase an printing speeds, greater filament control, increase in printed part densities, an improved final printed part quality, enhancement of retraction and restarting capabilities; and 6. it allows for a wider range of materials to be printed, eg. thermoplastic elastomer materials with a relatively low shore hardness such as shore 46 A.

Those skilled in the art will appreciate that the invention described herein is susceptible to variations and modifications other than those specifically described. All such variations and modifications are to be considered within the scope and spirit of the present invention the nature of which is to be determined from the foregoing description.

For instance, the bearings may include needle bearings, ball bearings or other suitable types. Also, the number, size and configuration of the bearings may vary to suit different types and sizes of filaments. Furthermore, instead of having a plurality of bearings, the biasing means may simply be in form of two separate pieces of pre-formed low friction material such as PFTE each being provided in the top and bottom plates 26 & 28 respectively. This is believed to achieve the same result of bending or folding and/or holding the flanges without the use of any bearings at all. Alternatively, the bending profiles may be omitted and completely replaced merely by the use of bearings. It is also contemplated that the device 10 may be configured to have multiple wheels similar or identical to 12 attached to the shaft 38 and controlled by motor 36. All of such wheels may be engaged independently by means for instance of an electronic- or mechanical-type clutch system thereby allowing multiple strands of pre-made filaments to be controlled by a single device.

A PTFE tubing system or the like may be used at the entry point to the guiding means 48 or 64 (see FIGS. 4 and 6) as a means to allow for guided feeding of the filament 14 from a filament holding spool to the device 10. This tubing system may also follow an arc allowing for the filament 14 to be fed from any chosen angle so in operation as to achieve a similar purpose as the annular bearing or pulley 78 depicted in FIG. 8.

Finally, the layout and configuration of the base or top plate(s) or filament guides may vary to hold additional components as required in order to facilitate efficient operation of the device.

The invention claimed is:

1. A device for controlling supply of a filament, the device including:
    a grooved rotatable wheel over which the filament runs, the wheel having a hub and a pair of flexible flanges extending radially from the hub;
    biasing means adapted in use to force the flexible flanges to bend towards each other so as to embrace the filament thereby pressing the filament tight against the hub, the biasing means including a pair of pre-shaped profiles and a plurality of bearings; and
    top and base plates adapted to respectively hold the bearings and profiles which in combination surround the wheel.

2. The device of claim 1, wherein the flexible flanges are substantially parallel to each other.

3. The device of claim 1, wherein the pair of pre-shaped profiles is adapted in use to be in contact with the respective flexible flanges.

4. The device of claim 1, wherein the plurality of bearings are supported by the profiles.

5. The device of claim 1, wherein the biasing means are in form of two pieces of low friction PFTE.

6. The device of claim 1, including a motor with a shaft being operably connected to the wheel.

7. The device of claim 1, wherein the top and base plates are brought together so as to apply pressure to the flexible flanges to form or hold the desired shape.

8. The device of claim 7, wherein the pressure is applied through the use of one or more tensioning means.

9. The device of claim 1, wherein each of the pair of flexible flanges includes an internal recess adapted to conform to a circular circumferential profile of the filament.

10. The device of claim 1, including a first guiding means which in use is in engagement with the wheel.

11. The device of claim 9, wherein the first guiding means includes a case; an impediment extending from the case and being adapted to be snugly received in a groove created by the pair of flexible flanges; and an elongate hollow with an opening adapted to receive the filament as it departs from the wheel and facilitate continuous guided travelling of the filament until it leaves the device.

12. The device of claim 11, wherein the impediment includes a protrusion that projects outward so as to be in close proximity to the side of an opening of the tube, the tongue being capable of ensuring no or at least negligible undesired cavity exists at or near the opening thereby reducing or eliminating the possibility of buckling of the filament.

13. The device of claim 12, wherein additional biasing means are provided to urge the flexible flanges against the protrusion at and/or around the opening so as to facilitate a smooth entrance of the filament into the tube.

14. The device of claim 10, wherein the first guiding means is used at both entry and exit points where the filament encounters the rotatable wheel.

15. The device of claim 1, wherein the device includes a second guiding means being located at an entry point and having a supporting block and a protuberance extending from the block.

16. The device of claim 3, wherein at least one of the profiles includes an extension around its periphery, where the extension meets the periphery of the other profile being offset with respect to where the two flexible flanges meet under the pressure applied by the profiles.

17. The device of claim 1, including a third guiding means adapted to enable the filament to be fed from any chosen angle.

18. The device of claim 1, wherein the top and base plates are hinged together so as to facilitate opening and closing of the device to allow access to its interior.

19. The device of claim 1, wherein either or both of an internal surface of each flexible flange and/or the circumference of the hub includes gripping means adapted to enhance the grip on the filament.

* * * * *